United States Patent [19]

Brooks et al.

[11] 4,103,921
[45] Aug. 1, 1978

[54] REAR STEERING TOY WHEELED VEHICLE

[75] Inventors: Bertram Brooks, New York, N.Y.; Eugene Speed, Tarboro, N.C.

[73] Assignee: Carolina Enterprises, Inc., New York, N.Y.

[21] Appl. No.: 811,245

[22] Filed: Jun. 29, 1977

[51] Int. Cl.² ............................................. B62K 9/00
[52] U.S. Cl. .................................. 280/267; 180/27; 280/259; 280/282
[58] Field of Search .................. 280/1.203, 210, 240, 280/259, 263, 267–269, 282; 180/27

[56] References Cited

U.S. PATENT DOCUMENTS

| | | | |
|---|---|---|---|
| 679,561 | 7/1901 | Hircock | 280/267 |
| 1,599,223 | 9/1926 | Epps | 280/269 |
| 2,136,019 | 11/1938 | Pfau | 280/267 X |
| 3,311,388 | 3/1967 | Ryan | 280/269 |
| 3,650,344 | 3/1972 | Plessinger | 180/27 |
| 3,669,468 | 6/1972 | Rich | 280/267 |
| 3,909,043 | 9/1975 | Black | 280/269 |
| 3,960,392 | 6/1976 | Read | 280/282 |

FOREIGN PATENT DOCUMENTS 488,463 11/1952 Canada .................................. 280/259

*Primary Examiner*—David M. Mitchell
*Assistant Examiner*—Terrance L. Siemens
*Attorney, Agent, or Firm*—Kirschstein, Kirschstein, Ottinger & Cobrin

[57] ABSTRACT

A rear steering three-wheeled toy vehicle includes a frame which is propelled by a pedal-driven front wheel assembly rotatably mounted on the leading end of the frame. A rear steering assembly having a pair of rear wheels is pivotally mounted at the trailing end of the frame for turning movement about an inclined pivot pin. Lever controls are operatively connected to the rear assembly for turning the same in requisite direction about the pivot axis. A stabilizing arrangement reinforces the pivot connection formed by the pivot pin intermediate the rear assembly and the frame. This arrangement includes a support member, opposite ends which are detachably connected to the frame and to one end of the pivot pin. The arrangement also includes a support rod, opposite ends of which are detachably connected to the rear assembly and to the opposite end of the pivot pin. For further reinforcement, a support plate is mounted intermediate the support member and the rear assembly, and a cap member is mounted over the other end of the pivot pin.

17 Claims, 5 Drawing Figures

REAR STEERING TOY WHEELED VEHICLE

BACKGROUND OF THE INVENTION

1. Field of the Invention

The present invention generally relates to vehicles and, more particularly, to rear steering wheeled toy vehicles which are adapted for use by small children.

2. Description of the Prior Art

The prior art has proposed toy vehicles for children in which the propelling i.e. pedalling and steering functions are both effected through a single front wheel with a pair of rear wheels being rotatably mounted on the vehicle in rigid, parallel relationship at all times. Such tricycles are unsatisfactory because the pivotal mounting of the front wheel interferes with the pedalling function since the front wheel must be turned at a sharp angle when making a turn. Moreover, the handle bars which move with the pivoting front wheel turn to an objectionable position when the front wheel is turned.

To overcome such disadvantages, the prior art has proposed rear steering tricycles wherein the front wheel is used for pedalling only, and wherein the steering function is effected by pivoting a rear trailer housing in which a single rear axle having a rear wheel at each of its opposite ends is journalled. However, such rear steering tricycles have proven unsatisfactory because the pivot pin, which defines the pivot axis about which the trailer housing is turned, is subject to forces tend generated during such turning of the trailer housing which tend to stress and shear the pivot pin. Moreover, such forces tend to urge the pivot pin out of the socket in which it is journalled, thereby deforming and otherwise destroying the socket itself so that the socket can no longer reliably rotatably support the pivot pin.

It has further been proposed in the prior art to constitute the frame and the trailer housing of such tricycles of synthetic plastic material. However, such plastic constituted parts are generally not strong enough to reliably resist deformation caused not only by the aforementioned forces generated during turning of the trailer housing, but also due to the weight of a rider who sits on the frame.

In order to strengthen the plastic frame, the prior art has also proposed mounting a one-piece bent brace member having a generally horizontal arm mounted on the frame, and an opposite generally vertical arm unitary with the horizontal arm and serving as the pivot pin. However, this construction has not proven satisfactory in use because the force of the weight of the rider as well as the shearing forces generated during turning of the trailer housing both combine to stress and shear the bent brace member in the region of its bend, i.e. intermediate its horizontal and vertical arms. Fracture of the brace member makes the toy vehicle unsuitable for further use.

In order to accommodate the body attitude of a rider to the pedals used for driving the front wheel of the tricycle, it is known to adjust the position of the seat portion relative to the fixed front wheel. However, this movement of the seat portion is disadvantageous because the seat portion tends to loosen from its position on the frame during use. This causes the seat portion to rock, thereby generating a highly unsatisfactory and hazardous condition.

SUMMARY OF THE INVENTION

Accordingly, it is the general object of the present invention to overcome the disadvantages of the prior art.

Another object of the present invention is to reinforce the pivot connection intermediate the rear trailer assembly and the frame.

Still another object of the present invention is to reliably prevent fracture of the pivot pin.

Yet another object of the present invention is to stiffen and reinfoce the frame and the trailer assembly so as to prevent deformation.

A still further object of the present invention is to prevent rocking of the seat portion on the frame.

An additional object of the present invention is to provide a three-wheeled vehicle in accordance with the preceding objects which will conform to conventional forms of manufacture, be of simple construction, and be easy to use so as to provide a device that will be economically feasible, long-lasting and relatively trouble-free in operation.

In keeping with these objects and others which will become apparent hereinafter, one feature of the invention resides, briefly stated, in a vehicle, particularly a rear steering toy vehicle, which comprises an elongated body unit or frame having opposite end regions, that is a leading and a trailing end region as considered in the direction of movement of the frame over the surface to be traversed. Propelling means, preferably a pedal-driven wheel assembly, is provided at the leading end region of the frame in order to propel the frame over the surface. Steering means for steering the frame during such propulsion over the surface includes a steering unit or trailer assembly at the trailing end region of the frame. The steering unit is pivotally connected to the body unit for turning movement about a pivot element or pin which extends generally along a pivot axis that extends transversely of the elongation of the body unit. The pivot connection formed by the pivot pin is reinforced by stabilizing means which is detachably connected to the pivot pin and which is located intermediate the latter and at least one of the units.

In accordance with the invention, the pivot connection intermediate the units is reinforced by stabilizing means which is detachably connected to the pivot pin. The stabilizing means includes a support member which is detachably connected to the body unit and to one end of the pivot pin, and a support rod which is detachably connected to the trailer assembly and to the opposite end of the pivot pin. This two-part detachable connection at said one end of the pivot pin eliminates the bend as taught by the bent brace member of the prior art construction and effectively resists fracture in the region of the bend. The additional two-part detachable connection at said opposite end of the pivot pin helps to reinforce the pivot connection as well as to distribute any forces acting on the body unit directly to the trailer assembly. To further distribute such forces evenly and uniformly throughout the vehicle, a support plate may be mounted intermediate the support member and the trailer assembly. For the same reasons, it is desirable to position a rear portion of the body unit above and in surface contact with a portion of the trailer assembly.

In accordance with another feature of the invention, the propelling means includes a crank axle and a front wheel mounted thereon. The crank axle may be journalled in any selected one of a plurality of bearing journals spaced lengthwise of the body unit, particularly at its leading end region. Thus, the position of the front wheel is adjustable relative to the seat in order to accommodate the body attitude of a rider. In other words, the seat itself is not movable along the body as taught by prior art constructions and, in fact, can be of one-piece with the body. This not only prevents rocking of the seat, but also tends to reinforce the body and prevent it from deformation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
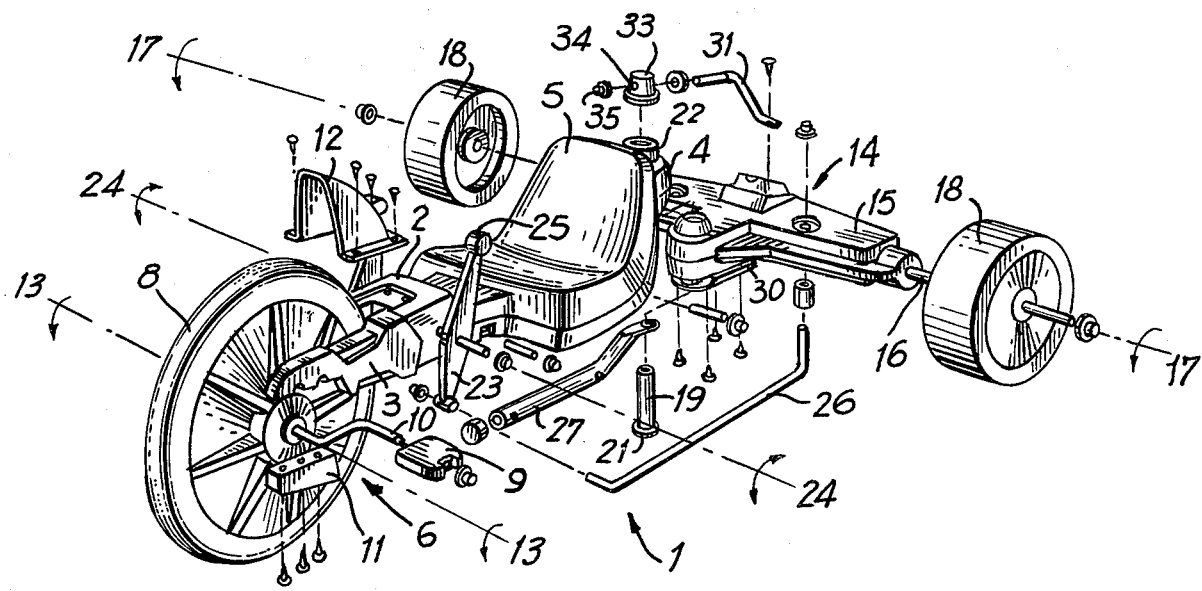
FIG. 1 is an exploded perspective view of the vehicle in accordance with the invention.

Reference numeral 1 in FIG. 1 generally identifies a toy vehicle, preferably a rear steering three-wheeled vehicle. Vehicle 1 comprises an elongated generally horizontally disposed body unit or frame 2 having a front or leading end region 3 and a rear or trailing end region 4 as considered in the direction of movement of the vehicle over a surface to be traversed. The terms "front, leading, rear and trailing" are not intended to be limiting; these terms are used merely to facilitate the following description of the vehicle, it being understood that the vehicle can also be moved in reverse. A seat 5 configured to receive a rider, particularly a small child, is located intermediate end regions 3 and 4.

Figure 2:
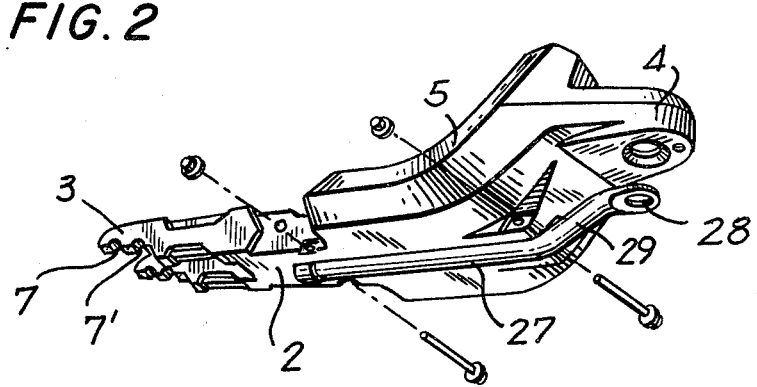
FIG. 2 is an exploded perspective view of the frame of the vehicle of FIG. 1 as seen from below.

In order to propel the body 2, a pedal-driven wheel assembly 6 is rotatably mounted at the leading end region 3. The leading end region 3 has a bifurcated front fork, each arm of which has a plurality of mounting portions or bearing journals 7, 7' (see FIG. 2). A conventional crank axle assembly on which front wheel 8 is fixedly mounted is journalled between the arms in either journals 7 or journals 7' for rotation about a horizontal axis, for example axis 13. A pair of foot pedals 9 is journalled on crank arms 10 (only one of which is shown) for driving the front wheel 8. Retainer block 11 overlies the open ends of U-shaped journals 7, 7' and is detachably mounted on the fork arms to permit selection of either journal 7 or 7'. In addition, a front fender 12 is mounted on leading end region 3 and embraces the upper rear quarter peripheral portion of the front wheel 8.

Figure 5:
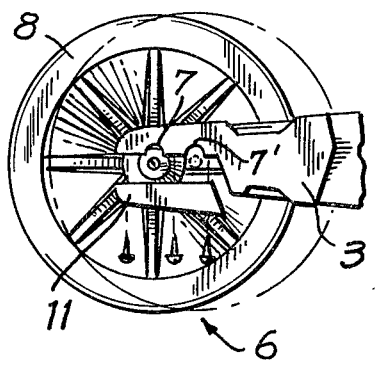
FIG. 5 is a partial side view of the front end region of the vehicle of FIG. 1 diagrammatically showing the adjustment of the relative position of the front wheel.

The particular set of journals selected, (i.e. either 7 or 7') depends upon the body size and attitude of the rider sitting on seat 5, that is in dependence upon the length of the legs of the rider so that he may engage the pedals 9. As diagrammatically shown in FIG. 5, if the crank axle is journalled in journal 7, then the front wheel 8 is positioned further from the seat 5. If the crank axle is journalled in journal 7', then the front wheel, as alternately shown by dash—solid lines, is positioned closer to the seat 5. Only two journals have been illustrated; however, additional journals may be provided to adjust the front wheel position to fit a particular child.

Figure 3:
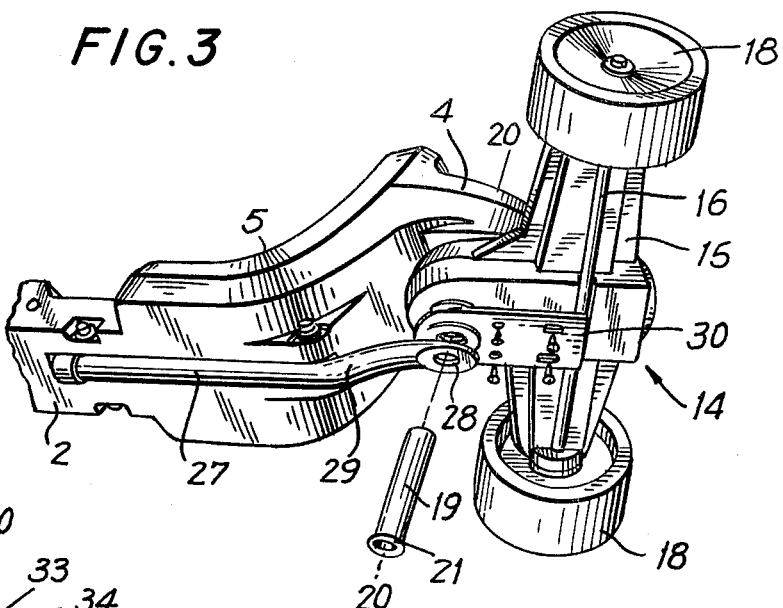
FIG. 3 is an exploded perspective view of the frame and the rear trailer assembly of the vehicle of FIG. 1 as seen from below.

In order to steer the body 2 over the surface during such propulsion, a rear steering unit or trailer assembly 14 is mounted at trailing end region 4. Trailer 14 includes a trailer housing 15 in which rear axle 16 is journalled for rotation about a generally horizontal axis 17. Rear wheels 18 are mounted at opposite ends of the single rear axle 16. As shown in FIG. 3, rear axle 16 is mounted at and in surface contact with the underside of housing 15 so as to reinforce the latter.

Figure 4:
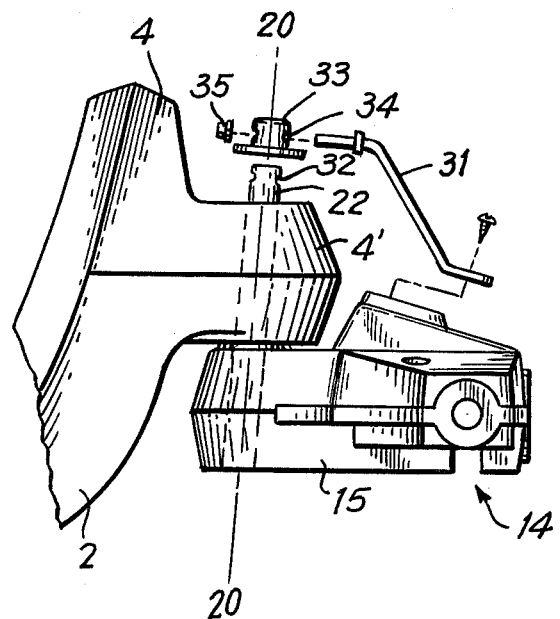
FIG. 4 is an enlarged side view of the pivot connection between the rear trailer assembly and the frame of the vehicle of FIG. 1, and also shows parts of the stabilizing means in exploded view.

Pivot element or pin 19 pivotally connects trailer 14 to body 2 at trailing end region 4 for turning movement about an inclined pivot axis 20 (see FIG. 4) which extends rearwardly and upwardly of the body 2. The pivot pin 19 has a tubular portion which extends through a passage formed in the housing 15 and in the body 2. An annular flange 21 at one end of pin 19 limits the depth of insertion of pin 19 into this passage so that the other opposite free end 22 of pin 19 projects outwardly above body portion 4' which overlies trailer housing 15.

A pair of steering or control levers 23 is pivotally mounted on body 2 in the region adjacent the seat 5 for turning movement in either direction about a generally horizontal steer axis 24. One end of each lever 23 has handle-grip knobs 25, and the other end of each lever 23 is coupled via control rods 26 to a respective side of the housing 15 at a respective side of the pivot pin 19. Accordingly, it may be seen that the trailer 14 can be pivoted in requisite direction about rearwardly and upwardly inclined pivot axis 20 by a rider using his hands to manipulate either one or both of the control levers 23.

The seat 5 is low-slung relative to the vehicle, that is, the vehicle has a low center of gravity and therefore the stability of the vehicle is enhanced during the execution of turns.

The body 2, the trailer housing 15 and the wheels 8, 18 are preferably formed by blow-molding techniques and are preferably constituted by synthetic plastic material. Since such plastic-molded parts are deformable by external forces and are therefore subject to damage, it is desirable to reinforce the vehicle construction. In accordance with the invention, a support member or tubular brace 27 has an annular cross-section end detachably mounted on body 2 over a portion of the length thereof in order to stiffen the body 2. The other end portion of brace 27 is planar and is provided with a hole 28 through which the tubular portion of pin 19 passes. An offset generally S-shaped portion 29 is located intermediate the ends of brace 27 in order to space the planar end portion at a different elevation relative to the annular end portion.

A support plate 30 is detachably mounted intermediate the planar end portion of the brace 27 and the underside of housing 15 in order to uniformly distribute any forces acting at the lower end of pivot pin 19 to the underside of the housing 15. The overhanging body portion 4' which lies above the upper side of housing 15 likewise tends to uniformly distribute any forces acting on the upper end of pivot pin 19 to the upper side of the housing 15.

A support rod 31 is used in order to still further reinforce the pivot pin 19 and protect the same from external forces which tend to stress and shear the pin, and which forces are particularly prominent during the pivoting of the trailer 14. Rod 31 has one end detachably mounted to the upper side of trailer housing 15, and its opposite free end is passed through a passage 32 which extends through free end 22 of pin 19 and is arrested in position thereat by fastener 35. More uniform distribution of forces to the upper side of body 2 is obtained by mounting a cap 33 over free end 22 of pin 19 so that channel 34 is aligned with passage 32 prior to insertion of rod 31.

Further reinforcement of the vehicle is obtained by forming seat portion 5 to be of one-piece with the body 2. This integral construction stiffens the entire frame.

In accordance with the invention, the brace 27 mounted at one side of the pin 19, and the rod 31 mounted at the other side of the pin 19 cooperate with each other to stabilize the pivot connection and prevent fracture of the pivot pin 19 — a drawback currently very prevalent in this art. The brace 27, rod 31, support plate 30, axle 16, and cap 33 may be constituted by any shape-retaining material, a metal material being currently preferred.

The vehicle described above may not only be used by children, but may also be used by adults by enlarging the dimensions of the vehicle. Moreover, the invention is not intended to be limited to wheeled vehicles or only to tricycles. Runners such as skis may replace the wheels; and more than three wheels is likewise contemplated.

It will be understood that each of the elements described above, or two or more together, may also find a useful application in other types of constructions differing from the types described above.

While the invention has been illustrated and described as embodied in a rear steering toy wheeled vehicle, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended:

1. A vehicle, particularly a toy vehicle, comprising:
   (a) an elongated body unit having opposite end regions;
   (b) means at one of said end regions for propelling said body unit over a surface;
   (c) means for steering said body unit over the surface during such propulsion, including
      a steering unit located at the other of said end regions of said body unit;
   (d) means for pivotally connecting said steering unit to said body unit for turning movement about an axis which extends transversely of the elongation of said body unit, including
      a pivot element extending generally along said axis intermediate said units and forming a pivot connection therewith; and
   (e) stabilizing means for reinforcing said pivot connection during turning movement of said steering unit about said pivot axis, said stabilizing means including a support member detachably connected to said body unit and to one end portion of said pivot element, and a support rod detachably connected to said steering unit and to another opposite end portion of said pivot element.

2. A vehicle, particularly a toy vehicle, comprising:
   (a) an elongated body unit having opposite end regions;
   (b) means at one of said end regions for propelling said body unit over a surface;
   (c) means for steering said body unit over the surface during such propulsion, including
      a steering unit located at the other of said end regions of said body unit;
   (d) means for pivotally connecting said steering unit to said body unit for turning movement about an axis which extends transversely of the elongation of said body unit, including
      a pivot element extending generally along said axis intermediate said units and forming a pivot connection therewith; and
   (e) stabilizing means detachably connected to said pivot element and being located intermediate the latter and at least one of said units, for reinforcing said pivot connection between said units during propulsion of said body unit, including
      an elongated movable support rod, and
      means for detachably mounting one end region of said support rod to said pivot element and the other opposite end region of said support rod to said steering unit to thereby permit movement of said support rod during turning about said axis.

3. The vehicle of claim 1, wherein said stabilizing means includes an elongated support member and means for detachably mounting the latter on and at least in part generally along the elongation of said body unit for strengthening the latter.

4. The vehicle of claim 3, wherein said support member has an end portion of annular configuration, an opposite end portion of generally planar configuration, and an offset portion intermediate said end portions for spacing the latter at a predetermined distance from each other.

5. The vehicle of claim 1, wherein said pivot element has a tubular portion, and wherein said stabilizing means comprises an elongated support member including an end portion having wall portions bounding a hole through which said tubular portion of said pivot element passes, and wherein said pivot element has means for limiting the depth of insertion of said tubular portion into said hole, including a flange portion on said pivot element for abutment with said wall portions of said support member.

6. The vehicle of claim 1, wherein said pivot element has a tubular portion formed with a passage and wherein said support rod has a free end portion which passes through said passage; and further comprising means for securing said free end portion of said support rod to said pivot element, including a cap member mountable over said free end portion and having a channel alignable with said passage for permitting entry of said free end portion through said passage and said channel.

7. The vehicle of claim 1, wherein said body unit has a body portion at said other end region thereof, and said steering unit has a steering portion which is overlain by said body portion at said other end region.

8. The vehicle of claim 1, wherein said stabilizing means includes a support plate detachably mounted on said steering unit for strengthening the latter.

9. The vehicle of claim 1; and further comprising means for adjustably mounting said propelling means at a selected position on said body unit, including a plurality of mounting portions spaced along the elongation of said body unit, each mounting portion operative for mounting said propelling means at the selected position.

10. The vehicle of claim 9, wherein said propelling means includes a crank shaft having offset ends on which pedals are mounted and wherein each mounting portion is a groove in which said crank shaft is journalled.

11. The vehicle of claim 1, wherein said body unit has a frame portion of blow-molded plastic material and has a seat portion of one-piece with said frame portion.

12. The vehicle of claim 1, wherein said steering unit includes a steering housing and an axle having wheels at opposite ends of said axle, said axle having one side engaging said housing for strengthening the latter, and another side facing the surface over which said body unit is propelled.

13. A toy vehicle, particularly a rear steering vehicle, comprising:
(a) a frame movable over a surface, said frame including an elongated frame portion having a leading and a trailing end region as considered in the direction of movement of said frame over the surface, and a seat portion intermediate said end regions;
(b) means for propelling said frame over the surface, including a pedal-driven wheel assembly rotatably mounted at said leading end region of said frame;
(c) a steering assembly at said trailing end region and having an axle and a pair of wheels at opposite ends of the latter;
(d) means for pivotally connecting said steering assembly to said frame for turning movement about a pivot axis which extends transversely of the elongation of said frame portion, including an elongated pivot element extending generally along said pivot axis intermediate said frame and said steering assembly and forming a pivot connection between the former and the latter;
(e) steering lever means for turning said steering assembly about said pivot axis, including a pair of levers turnably mounted on said frame portion adjacent said seat portion for swinging movement about a steer axis which extends transversely of the elongation of said frame; and
(f) stabilizing means for reinforcing said pivot connection during turning movement of said steering assembly about said pivot axis, said stabilizing means including a support member detachably connected to said frame and to one end portion of said pivot element, and a support rod detachably connected to said steering assembly and to another opposite end portion of said pivot element.

14. The toy vehicle of claim 13, wherein said seat portion is of one-piece with said frame portion, and is thereby fixed in position relative thereto; and wherein said pedal-driven wheel assembly includes a crank axle; further comprising means for adjustably mounting said pedal-driven wheel assembly relative to said seat portion to thereby accommodate a rider sitting on said seat portion, said adjustable mounting means including a plurality of mounting grooves spaced along the elongation of said frame portion, said adjustable mounting means being operative for journalling said crank axle at a selected one of said grooves.

15. A vehicle, particularly a toy vehicle, comprising:
(a) an elongated body unit having opposite end regions;
(b) means at one of said end regions for propelling said body unit over a surface;
(c) means for steering said body unit over the surface during such propulsion, including
a steering unit located at the other of said end regions of said body unit;
(d) means for pivotally connecting said steering unit to said body unit for turning movement about an axis which extends transversely of the elongation of said body unit, including
a pivot element extending generally along said axis intermediate said units and forming a pivot connection therewith; and
(e) stabilizing means detachably connected to said pivot element and being located intermediate the latter and at least one of said units, for reinforcing said pivot connection between said units during propulsion of said body unit, including
an elongated support member having an end portion of annular configuration, an opposite end portion of generally planar configuration, and an offset portion intermediate said end portions for spacing the latter at a predetermined distance from each other;
and means for detachably mounting said support member on and at least in part generally along the elongation of said body unit for strengthening the latter.

16. A vehicle, particularly a toy vehicle, comprising:
(a) an elongated body unit having opposite end regions;
(b) means at one of said end regions for propelling said body unit over a surface;
(c) means for steering said body unit over the surface during such propulsion, including
a steering unit located at the other of said end regions of said body unit;
(d) means for pivotally connecting said steering unit to said body unit for turning movement about an axis which extends transversely of the elongation of said body unit, including
a pivot element extending generally along said axis intermediate said units and forming a pivot connection therewith,
said pivot element having a tubular portion formed with a passage;
(e) stabilizing means detachably connected to said pivot element and being located intermediate the latter and at least one of said units, for reinforcing said pivot connection between said units during propulsion of said body unit, including
an elongated support rod having a free end portion which passes through said passage, and
means for detachably mounting the latter to said pivot element and to said steering unit; and (f) means for securing said free end portion of said support rod to said pivot element, including a cap member mountable over said free end portion and having a channel alignable with said passage for permitting entry of said free end portion through said passage and said channel.

17. A vehicle, particularly a toy vehicle, comprising:
(a) an elongated body unit having opposite end regions;
(b) means at one of said end regions for propelling said body unit over a surface;
(c) means for steering said body unit over the surface during such propulsion, including
   a steering unit located at the other of said end regions of said body unit,
   said steering unit including a steering housing and an axle having wheels at opposite ends of said axle, said axle having one side engaging said housing for strengthening the latter, and another side facing the surface over which said body unit is propelled;
(d) means for pivotally connecting said steering unit to said body unit for turning movement about an axis which extends transversely of the elongation of said body unit, including
   a pivot element extending generally along said axis intermediate said units and forming a pivot connection therewith; and
(e) stabilizing means detachably connected to said pivot element and being located intermediate the latter and at least one of said units, for reinforcing said pivot connection between said units during propulsion of said body unit.

* * * * *